(12) United States Patent
Endoh et al.

(10) Patent No.: US 7,086,368 B2
(45) Date of Patent: Aug. 8, 2006

(54) PISTON FOR AN INTERNAL COMBUSTION ENGINE

(75) Inventors: Tsuneo Endoh, Wako (JP); Masaki Nakata, Wako (JP); Kengo Ishimitsu, Wako (JP); Tsutomu Inoue, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/974,716

(22) Filed: Oct. 28, 2004

(65) Prior Publication Data

US 2005/0092280 A1 May 5, 2005

(30) Foreign Application Priority Data

Oct. 29, 2003 (JP) ............................. 2003-369311
May 24, 2004 (JP) ............................. 2004-153347

(51) Int. Cl.
*F02F 3/00* (2006.01)
*F16J 1/22* (2006.01)

(52) U.S. Cl. ................................... 123/193.6

(58) Field of Classification Search ............. 123/193.6, 123/197.3; 92/172–261; 29/888.042, 888.044, 29/888.045, 888.051
See application file for complete search history.

(56) References Cited

U.S. PATENT DOCUMENTS

| | | | |
|---|---|---|---|
| 1,401,075 A | | 12/1921 | Hartwig |
| 1,482,675 A | * | 2/1924 | Childers ........................ 92/159 |
| 1,763,523 A | * | 6/1930 | Jardine ........................ 92/236 |
| 3,069,210 A | * | 12/1962 | Rogers et al. ................. 92/187 |
| 4,372,179 A | * | 2/1983 | Dolenc et al. ............. 74/579 E |
| 4,765,292 A | * | 8/1988 | Morgado ................. 123/193.6 |
| 5,146,883 A | * | 9/1992 | Reipert et al. ........... 123/193.6 |
| 5,305,684 A | * | 4/1994 | Melchior ..................... 92/187 |
| 5,669,285 A | * | 9/1997 | Wiczynski et al. ........... 92/157 |
| 6,357,341 B1 | * | 3/2002 | Watanabe et al. ............. 92/238 |
| 6,408,813 B1 | * | 6/2002 | Wilksch et al. .......... 123/197.3 |

FOREIGN PATENT DOCUMENTS

| | | |
|---|---|---|
| DE | 881591 C | 7/1953 |
| FR | 1083390 A | 1/1955 |
| GB | 308905 A | 4/1929 |
| JP | 9-144879 A | 6/1997 |
| JP | 10-78130 A | 3/1998 |
| JP | 2000-39066 A | 2/2000 |
| JP | 2000-97105 A | 4/2000 |
| JP | 2000-97105 A | 4/2000 |
| JP | 2000-213646 A | 8/2000 |
| JP | 2002-317693 A | 10/2002 |

* cited by examiner

*Primary Examiner*—Marguerite McMahon
(74) *Attorney, Agent, or Firm*—Birch, Stewart, Kolasch & Birch, LLP

(57) ABSTRACT

A piston for an internal combustion engine includes a crown, tubular walls extending from the edge of the crown, and a cup portion protruding from the rear surface of the crown and having a concave spherical surface for forming a spherical joint with a spherical small end on a connecting rod. The tubular walls and the cup portion are joined together by radially extending ribs.

18 Claims, 15 Drawing Sheets

THRUST SIDE ⬅ ➡ ANTI-THRUST SIDE

THRUST SIDE ⬅ ➡ ANTI-THRUST SIDE

PISTON FOR AN INTERNAL COMBUSTION ENGINE

This Nonprovisional application claims priority under 35 U.S.C. § 119(a) on Patent Application Ser. No(s). 2003-369311 & 2004-153347 filed in Japan on Oct. 29, 2003 & May 24, 2004; respectively, the entire contents of which are hereby incorporated by reference.

FIELD OF THE INVENTION

This invention relates to a piston for an internal combustion engine, which is coupled to a small end of a connecting rod via a spherical joint.

BACKGROUND OF THE INVENTION

A piston for an internal combustion engine which is coupled to a connecting rod by a spherical joint is known from, for example, JP-A-9-144879 and JP-A-2000-213646. JP-A-9-144879 will be explained with reference to FIG. 16 hereof and JP-A-2000-213646 with reference to FIG. 17 hereof.

Referring to FIG. 16, a piston 200 has a concave spherical washer 203 having a concave spherical surface 202 and held on the rear surface of a crown 201 with a retainer 204, a connecting rod 206 having a convex spherical surface 208 formed on a small end 207 thereof and fitted sidably in the concave spherical surface 202 of the washer.

The concave spherical washer 203 and the retainer 204 on the rear surface of the crown 201, however, add to the weight of the piston 200. A reduction of its weight is difficult, since the concave spherical washer 203, retainer 204, bolts 211 and nuts 212 occupy the space under the crown 201 and do not allow the thickness of the crown 201 to be reduced.

As the concave spherical washer 203 is made of an iron-based material while the piston 200 is of an aluminum alloy, the concave spherical washer 203 is so low in thermal conductivity that heat is not conducted from the crown 201 to, for example, the connecting rod 206 easily. Accordingly, the crown 201 has a high temperature, raising the temperature of a land 214 and a skirt 215 near ring grooves adjacent to the crown 201 and thereby increasing the thermal expansion of the land 214 and the skirt 215. This makes it impossible to secure a proper clearance between the piston 200 and the wall of a cylinder bore in which the piston 200 is slidable.

Referring now to FIG. 17, a piston 220 has a spherical recess 221 formed in the rear surface of its crown 220a, while a connecting rod 222 has a spherical top 223 fitted in the spherical recess 221 and having a lower portion supported sidably on the spherical inner surface 226 of a fixing plate 224 secured to the rear surface of the crown 220a of the piston 220 by bolts 227.

The crown 220a of the piston 220 has a large thickness, since its rear surface is situated at as low a level as the vertically middle portion of the top 223 of the connecting rod 222 so that the fixing plate 224 may be secured thereto. A reduction in thickness of the crown 220a, for example, would enable a reduction in weight of the piston. It would, however, be necessary to prevent the concentration of stress on the crown 220a from being caused by the pressure of combustion gases and force of inertia acting upon the piston 220.

An elevation in temperature of the crown 220a resulting from engine operation is likely to lower the viscosity of the lubricant oil between the recess 221 of the piston 220 and the top 223 of the connecting rod 222 and eventually cause the oil film to disappear from therebetween. The same reason as has been stated in connection with JP-A-9-144879 disables a proper clearance to be secured between the piston 220 and a cylinder. An increase in the dissipation of heat from the crown 220a would make the coupling between the piston 220 and the connecting rod 222 and the sliding of the piston 220 relative to the cylinder possible more smoothly.

As the pressure of combustion gases acts upon the piston for an internal combustion engine during its combustion stroke, an external force produced by the pressure of combustion gases acts upon various parts of the piston. This external force will be explained with reference to FIG. 18.

Referring to FIG. 18, a piston 232 is movably mounted in a cylinder 231 and a connecting rod 234 has a small end 236 attached to the piston 232 rotatably by a piston pin 233. The connecting rod 234 also has a big end 237 linked to a crank pin on a crankshaft. Reference numerals 241, 242 and 243 denote the crown, land and skirt, respectively, of the piston 232, 244 denotes a combustion chamber, 246 is a point indicating the axis of the crank pin, 247 is a point indicating the axis of the crankshaft and 248 indicates the axis of the cylinder 231.

Upon explosion of a fuel mixture in the combustion chamber 244, the pressure of combustion gases acts downwardly upon the top 241 of the piston 232 as shown by an outline arrow, and as an upward force of inertia acts upon the piston 232 when it moves down, the resultant of the forces of combustion gases and inertia, which is equal to the force of combustion gases less the force of inertia, acts upon the piston 232 and an upward force F equal to the resultant is produced. When the connecting rod 234 is inclined by an angle θ to the axis 248, a thrust R (=F·tan θ) is produced as a component force.

That side of the piston 232 on which the thrust R is produced is called the thrust side, which lies in FIG. 18 on the left-hand side of a plane extending through the axis of rotation of the connecting rod 234 relative to the piston 232 (i.e. the axis of the piston pin 233 extending at right angles to the drawing sheet and indicated by a point 250) and in parallel to the axis 248, while the right-hand side of the plane in FIG. 18 is called the anti-thrust side.

There is known a piston for an internal combustion engine in which a rib formed on the rear surface of its crown has a different shape between its thrust and anti-thrust sides, as disclosed, for example, in JP-A-2000-97105. The following is an outline of its disclosure.

The piston has a head, a pair of pin bosses protruding from the head and a substantially arcuate skirt extending from the edge of the head. The piston also has a front and a rear rib joining the pin bosses and skirt integrally with the lower surface of the head.

The pressure of combustion acting upon the head, for example, produces a large stress thereon. An increase in thickness of the head may be effective for reducing any such stress, but as the rear surface of the head is not simple in shape because of the pin bosses, skirt, etc., the stress is concentrated on local areas of the head and is difficult to reduce by increasing the thickness of the head uniformly across its rear surface. Moreover, an increase in thickness of the head adds to the weight of the piston, i.e. its inertia weight, thereby making it difficult to obtain a piston suitable for an internal combustion engine of faster rotation and higher output.

Therefore, it is desirable to reduce any concentration of stress on the crown of a piston for an internal combustion engine, achieve a reduction in weight of the piston and a lower piston temperature and thereby realize an internal combustion engine of faster rotation and higher output.

SUMMARY OF THE INVENTION

According to this invention, there is provided a piston for an internal combustion engine including a crown, a tubular wall extending from the edge of the crown and a cup portion protruding from the rear surface of the crown and having a concave spherical surface for forming a spherical joint with a spherical small end on a connecting rod, wherein the tubular wall and cup portion are joined together by radially extending ribs.

The radial ribs can disperse any stress produced on the crown and the cup for a spherical joint by the pressure of combustion gases or force of inertia acting thereupon. The ribs make it possible to provide a piston of reduced weight, since it is no longer necessary to increase the thickness of the crown to prevent the concentration of stress thereon.

Accordingly, the piston has a smaller force of inertia acting thereon and a lower load bearing on its support, or spherical joint and makes it possible to realize an internal combustion engine of faster rotation and higher output.

The radial ribs also serve as cooling fins to dissipate heat from the crown efficiently and lower its temperature. Accordingly, it is possible to reduce any heat conducted to the cup portion for the spherical joint and the tubular wall and thereby lower their temperatures. As a result, it is possible to prevent the loss of any lubricant oil from between the sliding surfaces of the spherical joint and it is also possible to decrease the thermal expansion of the tubular wall and thereby maintain a proper clearance between the tubular wall and the cylinder.

According to another aspect of this invention, there is provided a piston for an internal combustion engine including a crown, a tubular wall extending from the edge of the crown and a cup portion formed on the rear surface of the crown for forming a spherical joint with a spherical small end on a connecting rod, the cup portion and tubular wall being joined together by radial ribs, wherein the radial ribs on the thrust side of the piston are asymmetric to those on its anti-thrust side.

The radial ribs make it possible to mitigate the concentration of stress on the crown and moreover, the asymmetric arrangement of the ribs on the thrust and anti-thrust sides of the piston makes it possible to reduce the volume of every rib on the anti-thrust side where no thrust acts upon the piston, as opposed to the symmetric arrangement of the ribs, thereby making it possible to reduce the weight of the ribs and thereby of the piston as a whole. Accordingly, the piston has a smaller inertia weight and makes it possible to provide an internal combustion engine of faster rotation and thereby higher output.

According to this invention, the radial ribs are preferably spaced apart from one another by a greater distance on the anti-thrust side of the piston than on the thrust side thereof. The greater distance between the ribs on the anti-thrust side makes it possible to reduce their total weight, while the ribs which are closer to one another on the thrust side can bear any thrust acting upon the piston. Accordingly, a reduction can be made in the weight of the piston.

According to another feature of this invention, each of the radial ribs preferably has a smaller thickness on the anti-thrust side than on the thrust side. The smaller thickness of the ribs on the anti-thrust side makes it possible to reduce their total weight, while the ribs having a larger thickness on the thrust side can bear any thrust acting upon the piston. Accordingly, a reduction can be made in the weight of the piston again.

According to still another feature of this invention, each of the radial ribs preferably has a smaller height on the anti-thrust side than on the thrust side. The smaller height of the ribs on the anti-thrust side makes it possible to reduce their total weight, while the higher ribs on the thrust side can bear any thrust acting upon the piston. Accordingly, a further reduction can be made in the weight of the piston.

BRIEF DESCRIPTION OF THE DRAWINGS

Certain preferred embodiments of the invention will be described in detail below, by way of example only, with reference to the accompanying drawings, in which.

DETAILED DESCRIPTION OF THE PREFERRED EMBODIMENTS

Figure 1:
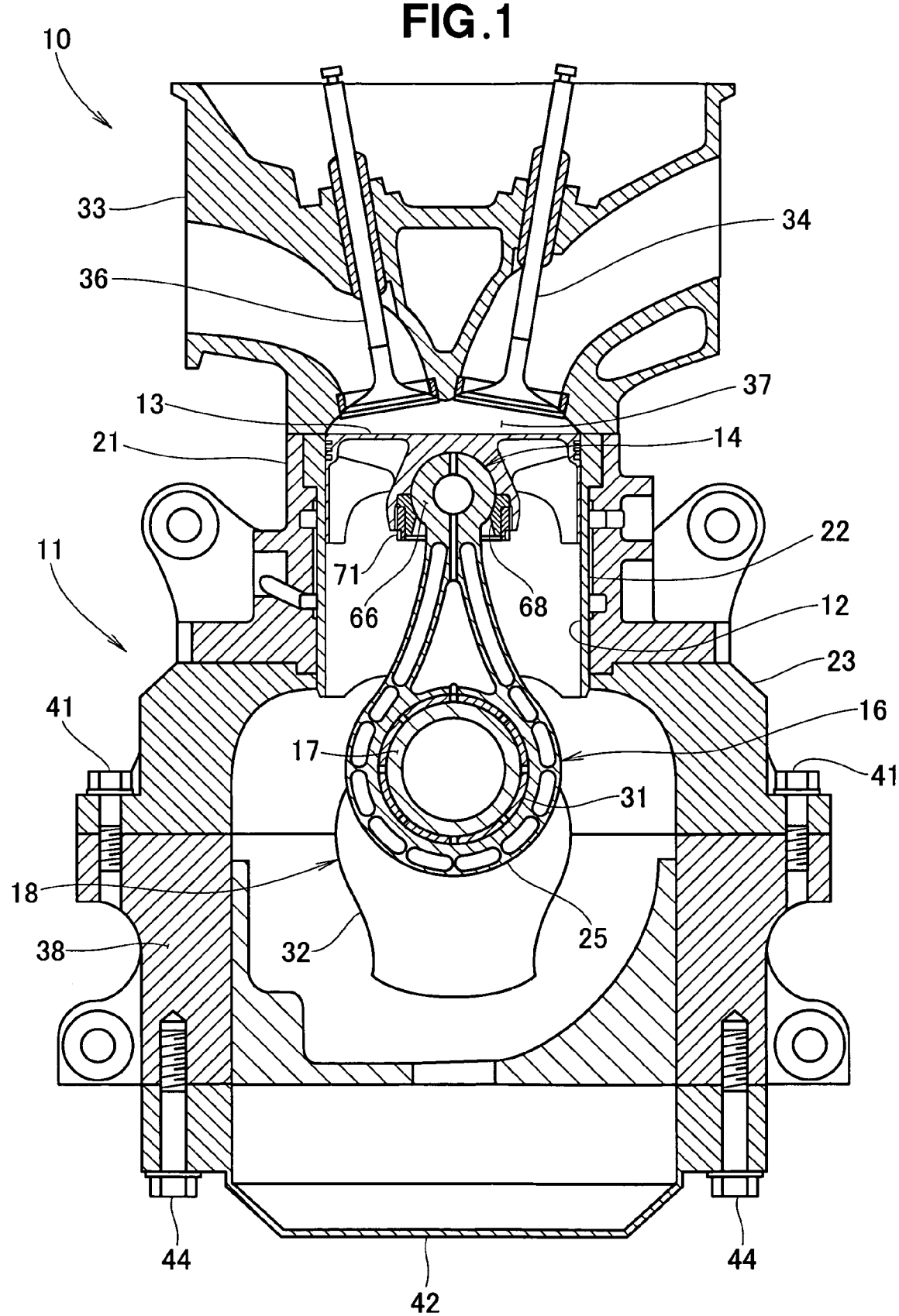
FIG. 1 is a longitudinal sectional view of an internal combustion engine including a piston according to a first embodiment of this invention.

Referring first to FIG. 1, an internal combustion engine 10 has a cylinder block 11, a piston 13 fitted movably in a cylinder bore 12 formed in the cylinder block 11, a connecting rod 16 coupled to the piston 13 by a spherical joint 14, and a crankshaft 18 attached rotatably to a lower portion of the cylinder block 11 and supporting the connecting rod 16 swingably by a hollow crank pin 17.

The cylinder block 11 has a cylinder 21 formed in its upper portion, a cylindrical sleeve 22 fitted in the cylinder 21 and defining the cylinder bore 12 and an upper crankcase 23 attached to the bottom of the cylinder 21.

Reference numeral 31 denotes a sliding bearing disposed between the big end 25 of the connecting rod 16 and the crank pin 17; 32, a counter-weight on the crankshaft 18; 33, a cylinder head attached to the top of the cylinder block 11 with a head gasket disposed therebetween, but not shown; 34, an intake valve; 36, an exhaust valve; 37, a combustion chamber; 38, a lower crankcase secured to the bottom of the upper crankcase 23 by bolts 41 and forming a crankcase therewith; and 42, an oil pan secured to the bottom of the lower crankcase 38 by bolts 44.

Figure 2:
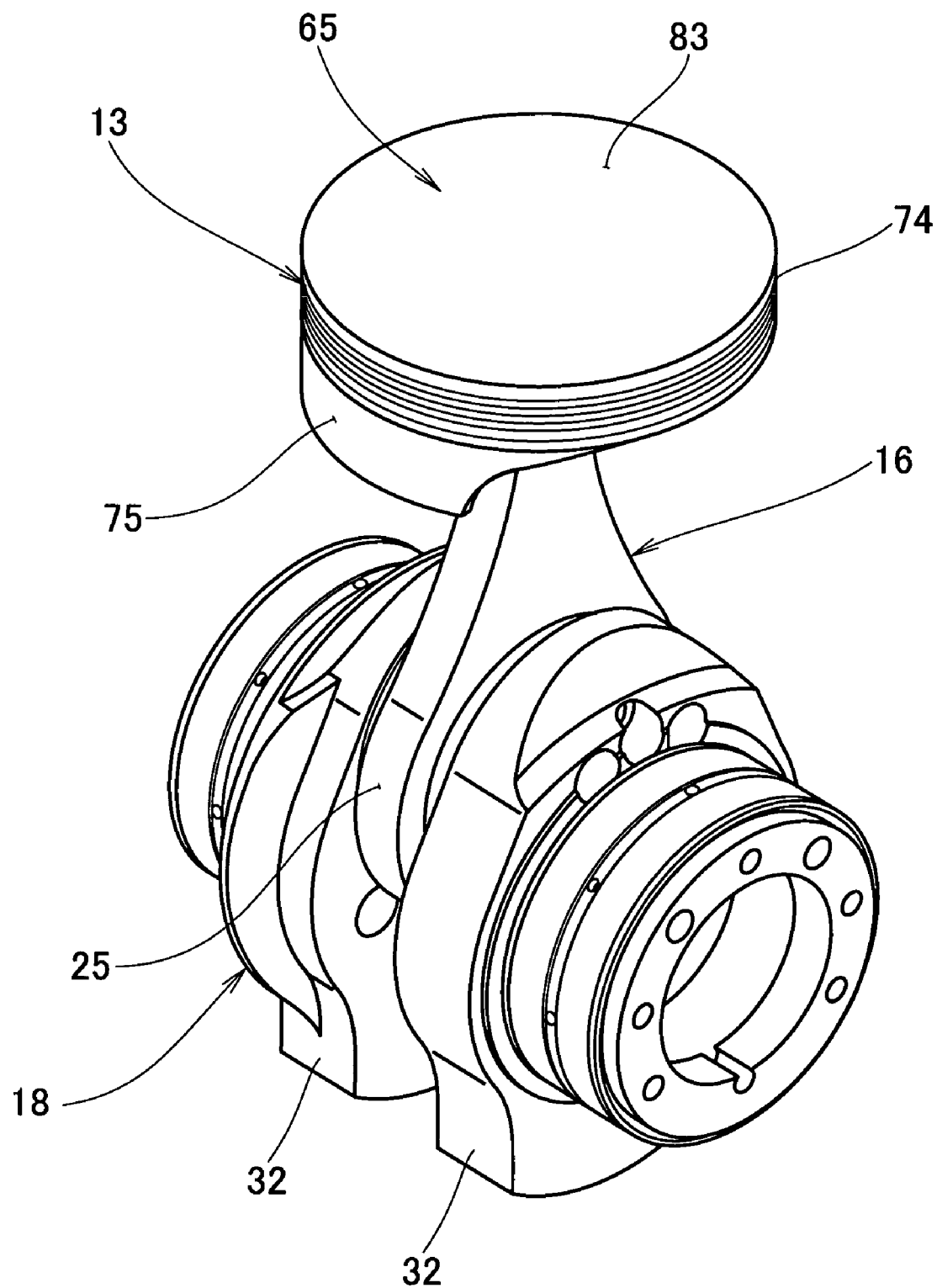
FIG. 2 is a perspective view showing the assembly of the piston according to the first embodiment of this invention, a connecting rod and a crankshaft.

FIG. 2 shows the connecting rod 16 coupled swingably to the piston 13 and the crankshaft 18.

The piston 13 may, for example, be obtained by casting a material designated as AC8A [JIS H 5202], subjecting a casting to T6 heat treatment and machine finishing it. The connecting rod 16 is preferably formed from chromium or chromium-molybdenum steel, or a titanium alloy.

Figure 3:
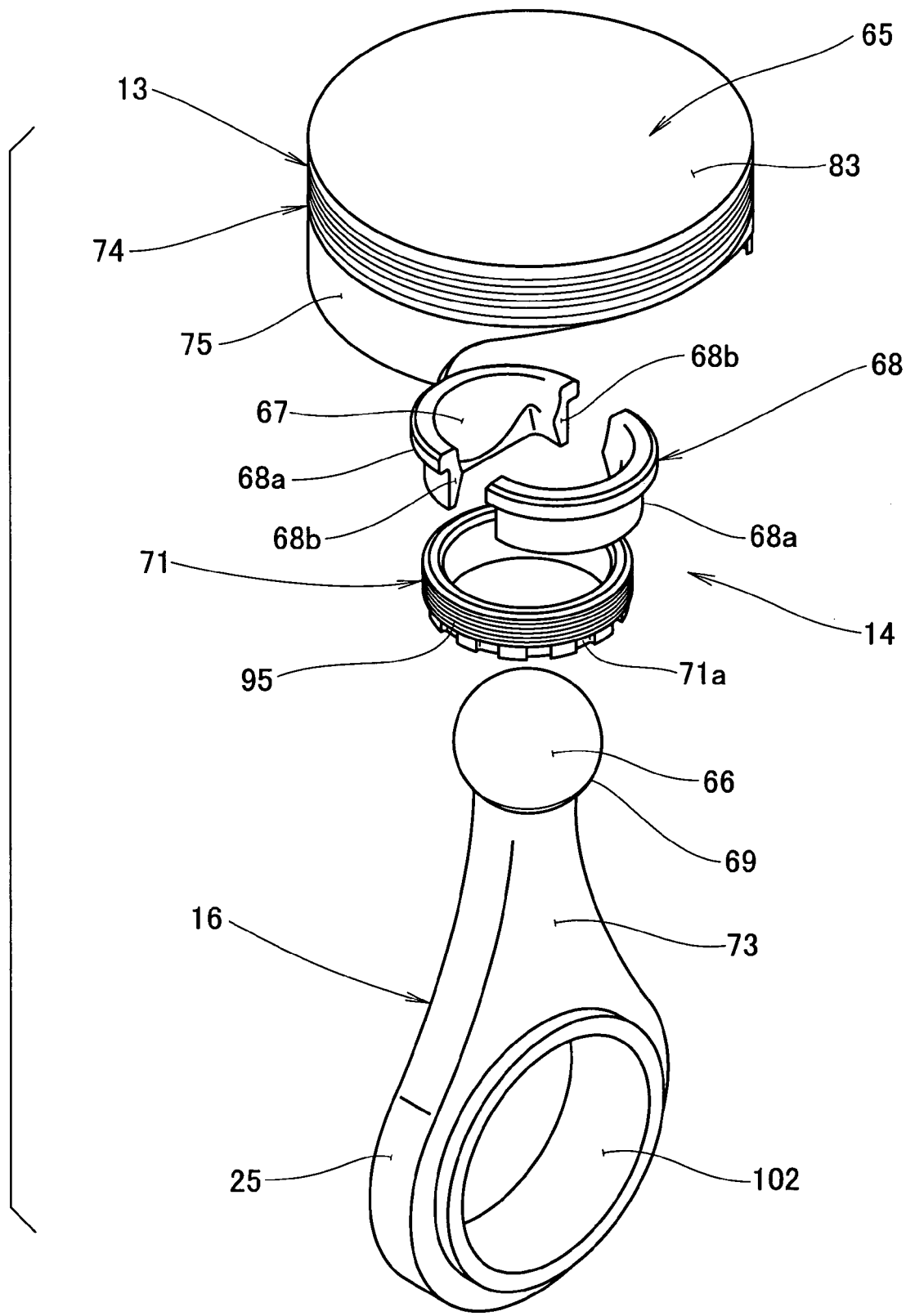
FIG. 3 is a perspective view showing a coupling structure between the piston according to the first embodiment of this invention and the connecting rod.

FIG. 3 shows a structure in which a spherical small end 66 on the connecting rod 16 has an upper portion contacting the rear surface of the crown 65 of the piston 13 (which will be detailed later) and a lower portion held by a split holder 68 having two concave spherical surfaces 67 (of which only one is shown at 67), the holder 68 being attached to the rear surface of the crown 65 of the piston 13 by a nut 71. Reference numeral 69 denotes the spherical surface of the small end 66.

The connecting rod 16 is formed by the small end 66, the annular big end 25 and a rod portion 73 joined to the small and big ends 66 and 25 integrally.

The holder 68 is formed by two holder halves 68a. 68b denotes mating surfaces where the two holder halves 68a are mated. The holder 68 and the nut 71 are members forming a part of the spherical joint 14.

Figure 4:
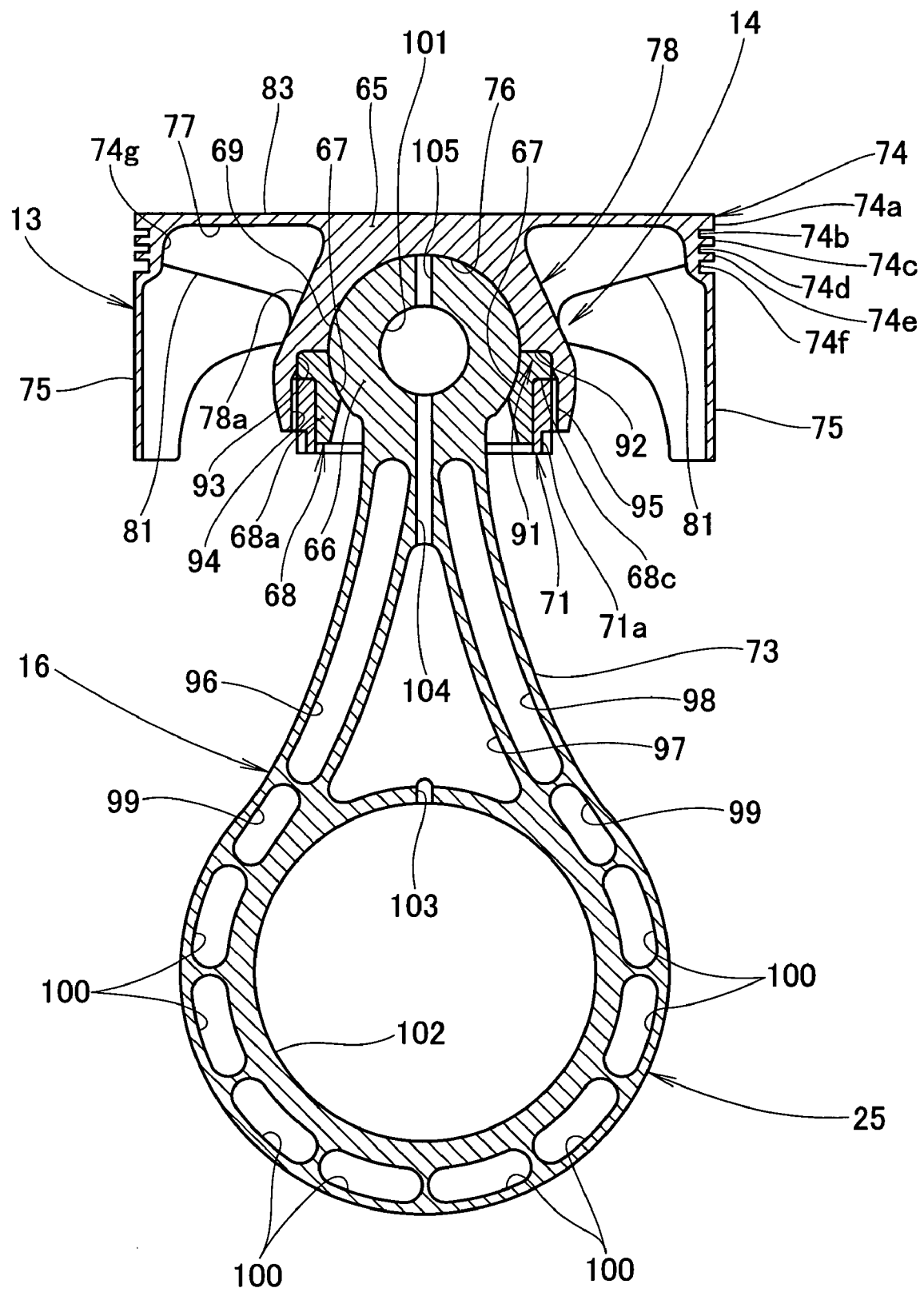
FIG. 4 is a longitudinal sectional view of the piston according to the first embodiment of this invention and the connecting rod.

Referring to FIG. 4, the piston 13 is an integrally formed combination of the crown 65 shaped like a disk, a tubular land 74 extending downward from the edge of the crown 65 and having a large wall thickness, tubular skirts 75 extending downward from the land 74, having a smaller thickness than that of the land 74 and forming a tubular wall, a cup-shaped support 78 formed on the rear surface 77 of the crown 65 to form a concave semi-spherical surface 76 in which the small end 66 of the connecting rod 16 is sidably fitted and a plurality of ribs 81 extending between the land 74 and the cup-shaped support 78 and downward from the rear surface 77 of the crown 65.

The crown 65 has a crown surface 83 defining a part of the combustion chamber 37 (see FIG. 1). The land 74 is a portion formed along the edge of the crown 65 and having a top land 74a, a top ring groove 74b, a second land 74c, a second ring groove 74d, a third land 74e and an oil ring groove 74f in the order mentioned as viewed from the crown surface 83, and a top ring is fitted in the top ring groove 74b, a second ring in the second ring groove 74d and an oil ring in the oil ring groove 74f.

The cup-shaped support 78 has a downward recess 91 opening downwardly, the concave semi-spherical surface 76 formed in the bottom 92 of the downward recess 91 and a female thread 94 formed in the inner peripheral surface of the downward recess 91. The connecting rod 16 is swingably coupled to the piston 13 by having its small end 66 held against the concave semi-spherical surface 76, placing the holder 68 in the downward recess 91 to have the small end 66 of the connecting rod 16 held on the spherical surfaces 67 of the holder 68 and engaging a male thread 95 on the nut 71 with the female thread 94 of the cup-shaped support 78.

The cup-shaped support 78, holder 68, nut 71 and small end 66 form the spherical joint 14.

The holder 68 is a member held against rotation relative to the cup-shaped support 78 by a stop pin not shown, and having a guide surface not shown, but abutting on the rod 73 to hold the piston 13 against rotation relative to the connecting rod 16.

Each holder half 68a has a shoulder 68c and the nut 71 has its upper end held against the shoulder 68c to fix the holder half 68a in position.

The nut 71 has the male thread 95 and a plurality of engaging recesses 71a formed around its outer peripheral surface adjacent to its lower end so that a tool may be engaged therein to turn the nut.

The connecting rod 16 has hollows 96 to 100 in its big end 25 and rod portion 73 and a hollow 101 in its small end 66 to have its weight reduced and also has oil holes 103 to 105 through which oil can be supplied from a mounting hole 102 in its big end 25 to the sliding surfaces of the spherical joint 14.

Figure 5:
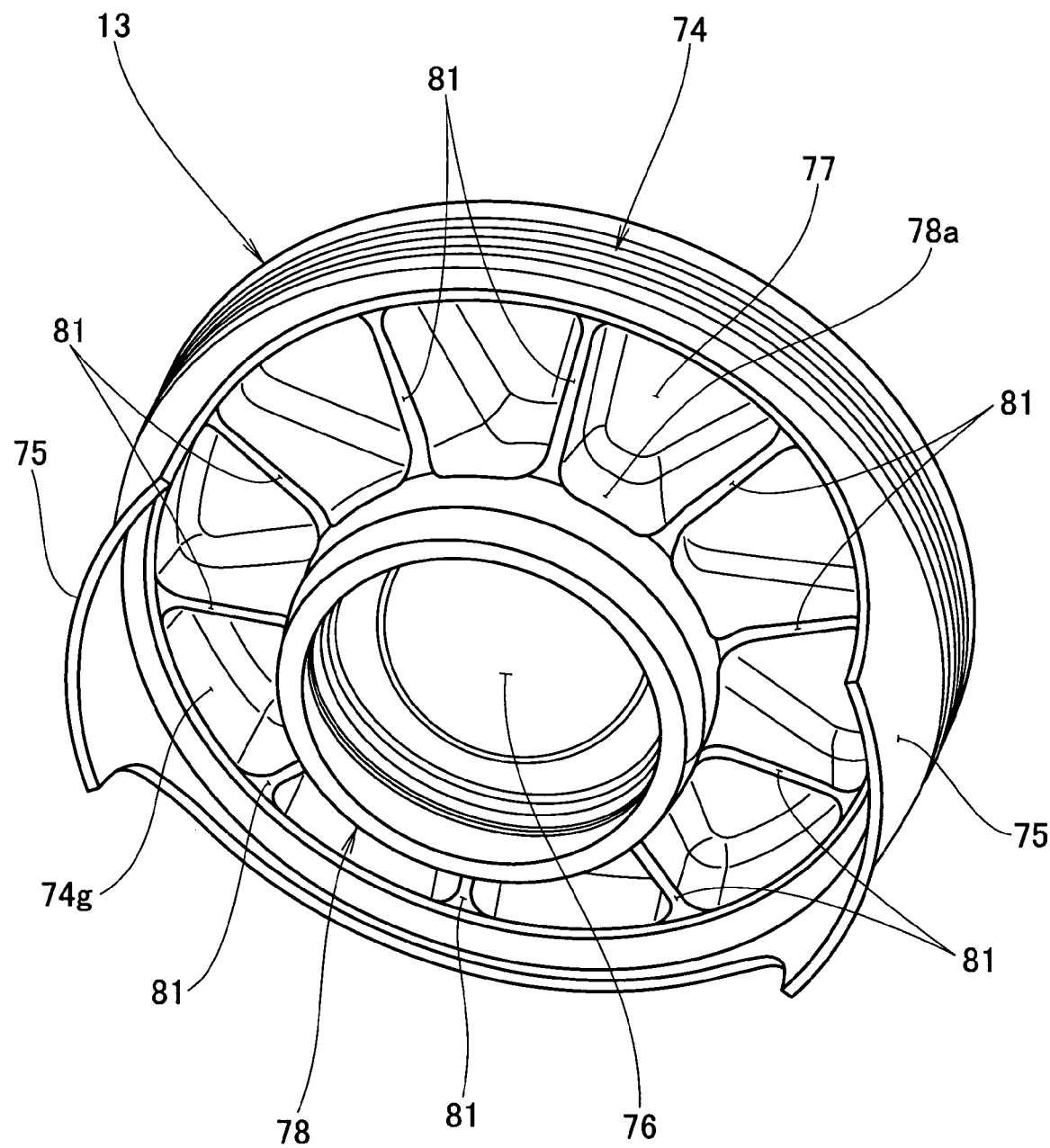
FIG. 5 is a perspective view of the piston according to the first embodiment of this invention.

FIG. 5 shows in detail the ribs 81 formed on the rear surface 77 of the crown 65 (see FIG. 4) of the piston 13 for connecting the land 74 and the cup-shaped support 78. The ribs 81 provide a rigid connection between the land 74 and the cup-shaped support 78 and thereby raise the rigidity of the upper portion of the piston 13. The individual ribs 81 may be small enough in thickness to suppress any undesirable increase in weight that they would otherwise give to the piston.

Figure 6:
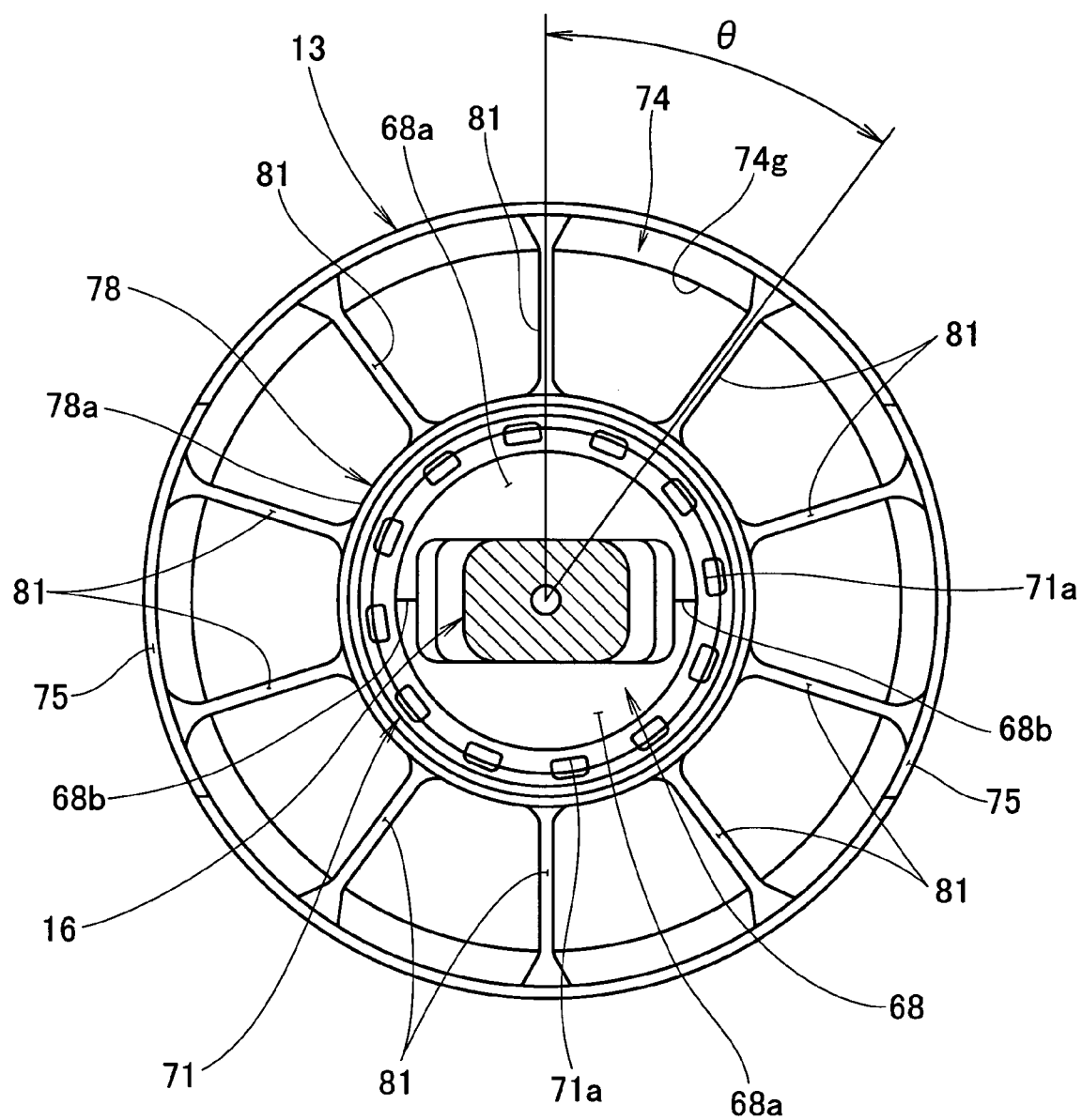
FIG. 6 is a bottom plan view showing the rear surface of the piston according to the first embodiment of this invention.

FIG. 6 shows more clearly that the ribs 81 are formed radially between the inner surface 74g of the land 74 and the outer surface 78a of the cup-shaped support 78 in the piston 13.

It shows ten ribs 81 so formed that every two adjoining ribs 81 may have an angle θ of 36° therebetween.

The function of the ribs 81 will be described below.

Figure 7:
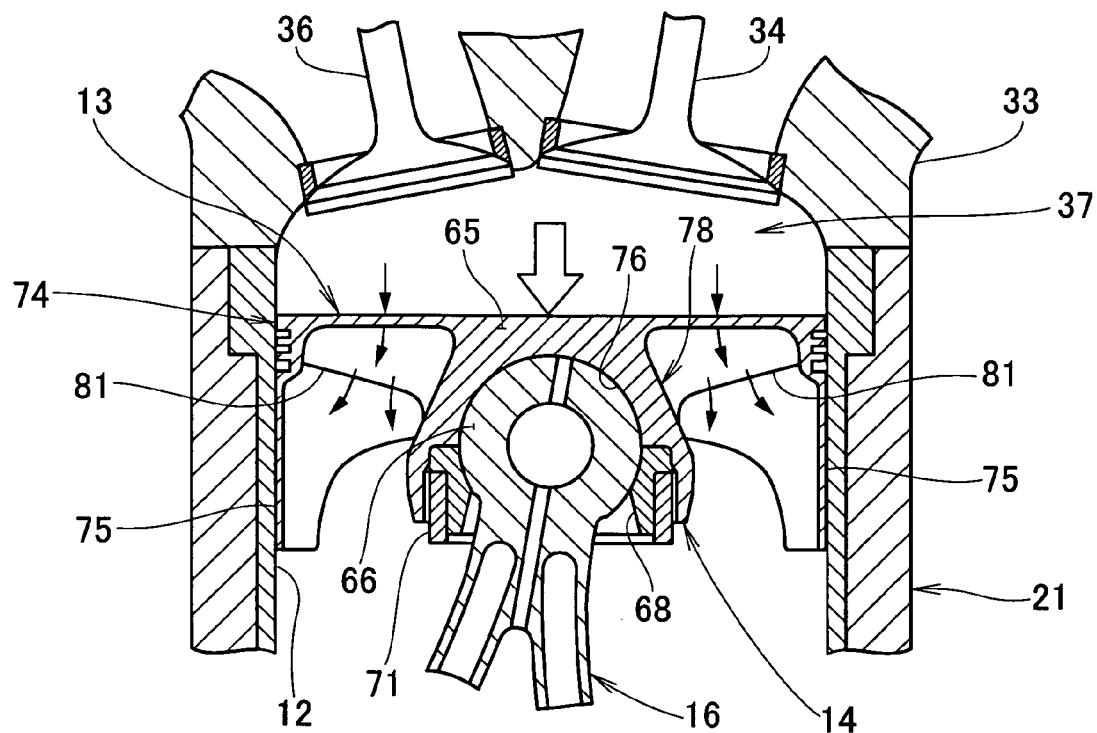
FIG. 7 is a view illustrating the action of ribs in the piston according to the first embodiment of this invention against an external force and heat.

When the explosion of a fuel mixture in the combustion chamber 37 causes the pressure of combustion gases to act upon the crown 65 of the piston 13 as shown by an outline arrow in FIG. 7, the stress thereby produced in the crown 65 is dispersed by the ribs 81 and is not concentrated locally on any part of the crown 65 or the cup-shaped support 78 (for example, on the base of the cup-shaped support 78). Therefore, a reduction in thickness of the crown 65 does not bring about any increase of stress produced therein, but contributes to a reduction in weight of the piston 13.

When the explosion of the fuel mixture in the combustion chamber 37 causes the temperature of the crown 65 to rise, the heat of the crown 65 is dissipated therefrom into the cylinder 21 through the ribs 81 as shown by arrows in FIG. 7, or through the cup-shaped support 78 and the ribs 81, or through the land 74 and the ribs 81.

Figure 8:
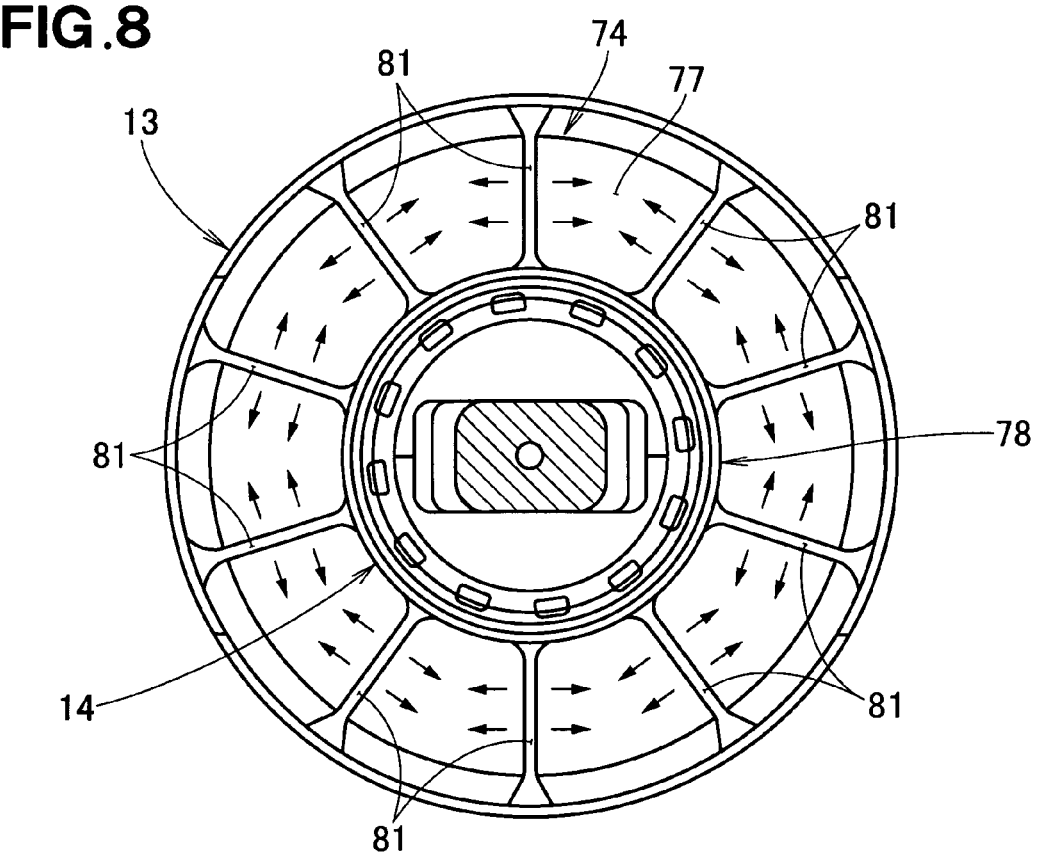
FIG. 8 is a view illustrating the action of the ribs according to the first embodiment of this invention for dispersing stress and dissipating heat.

As the ribs 81 are formed on the rear surface 77 of the crown 65 (FIG. 7) radially at circumferentially equal intervals as shown in FIG. 8, it is possible to distribute the stress of the crown 65 uniformly to all the ribs 81 and thereby lower the maximum value of the stress.

A high effect of heat dissipation owing to the release of heat through all the ribs 81 as shown by arrows in FIG. 8 makes it possible to lower the temperature of any part of the piston 13. Referring to FIG. 7, therefore, it is possible to lower the temperature of the spherical joint 14, or more particularly of the concave spherical surface 76 of the cup-shaped support 78 and thereby prevent the disappearance of any oil film from between the concave spherical surface 76 and the small end 66 of the connecting rod 16.

It is, moreover, possible to decrease the thermal expansion of the land 74 and the skirts 75 and thereby maintain the clearances between the wall of the cylinder bore 12 and the land 74 and the wall of the cylinder bore 12 and the skirts 75 within proper ranges.

Although the ribs 81 in the piston described above are formed integrally with the rear surface 77 of the crown 65, the cup-shaped support 78 and the land 74 as shown in FIG. 4, it is alternatively possible to form the ribs 81 in such a way that none or only a part of them may be connected with the rear surface 77 of the crown 65.

Figure 9:
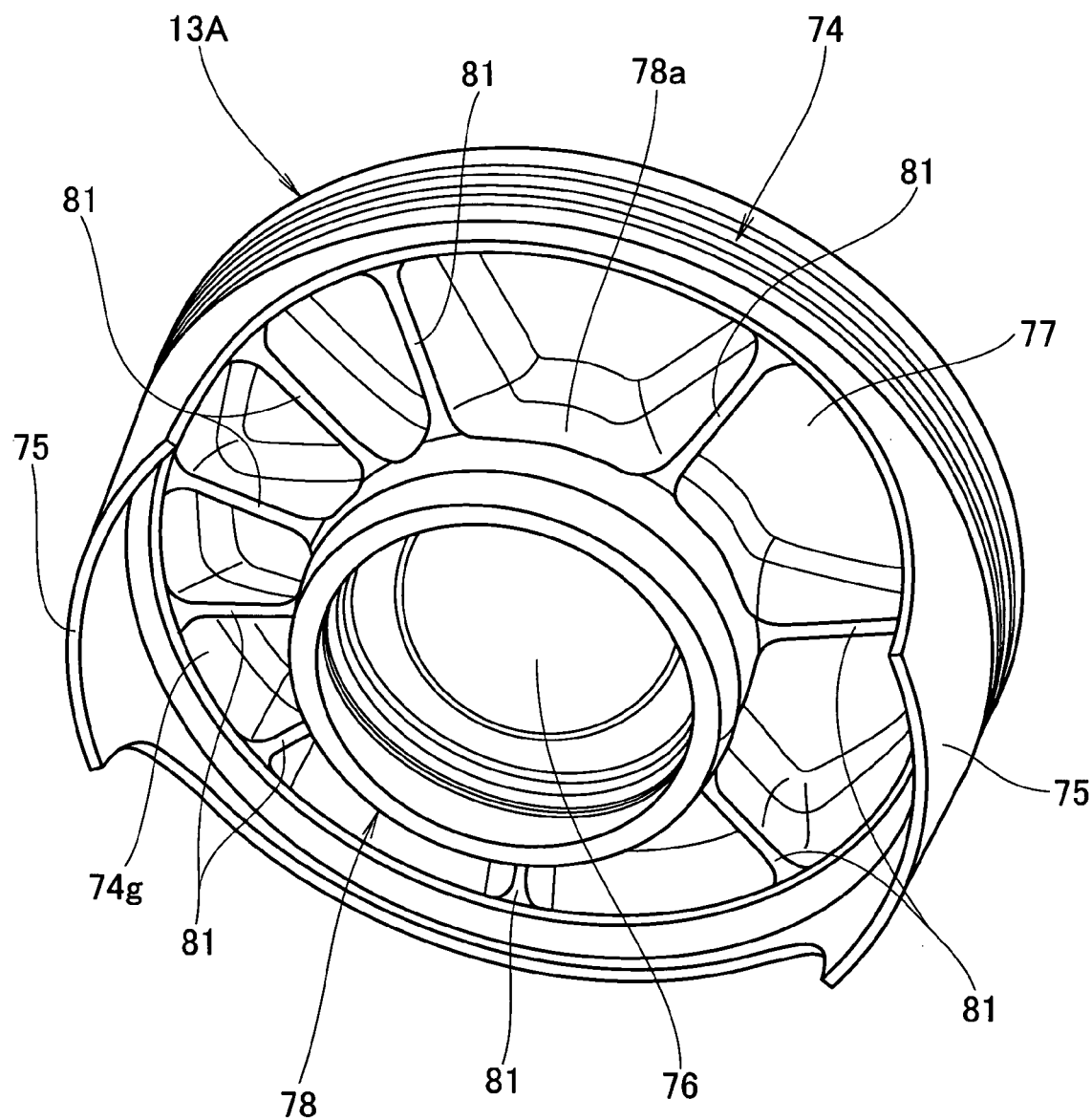
FIG. 9 is a perspective view of a piston according to a second embodiment of this invention.

FIG. 9 shows a plurality of ribs 81 formed on the rear surface 77 of the crown 65 (see FIG. 4) of a piston 13A according to another embodiment of this invention. The ribs 81 provide a rigid connection between a land 74 and a cup-shaped support 78 and thereby raise the rigidity of the upper portion of the piston 13A. The individual ribs 81 may be small enough in thickness to suppress any undesirable increase in weight that they would otherwise give to the piston.

Figure 10:
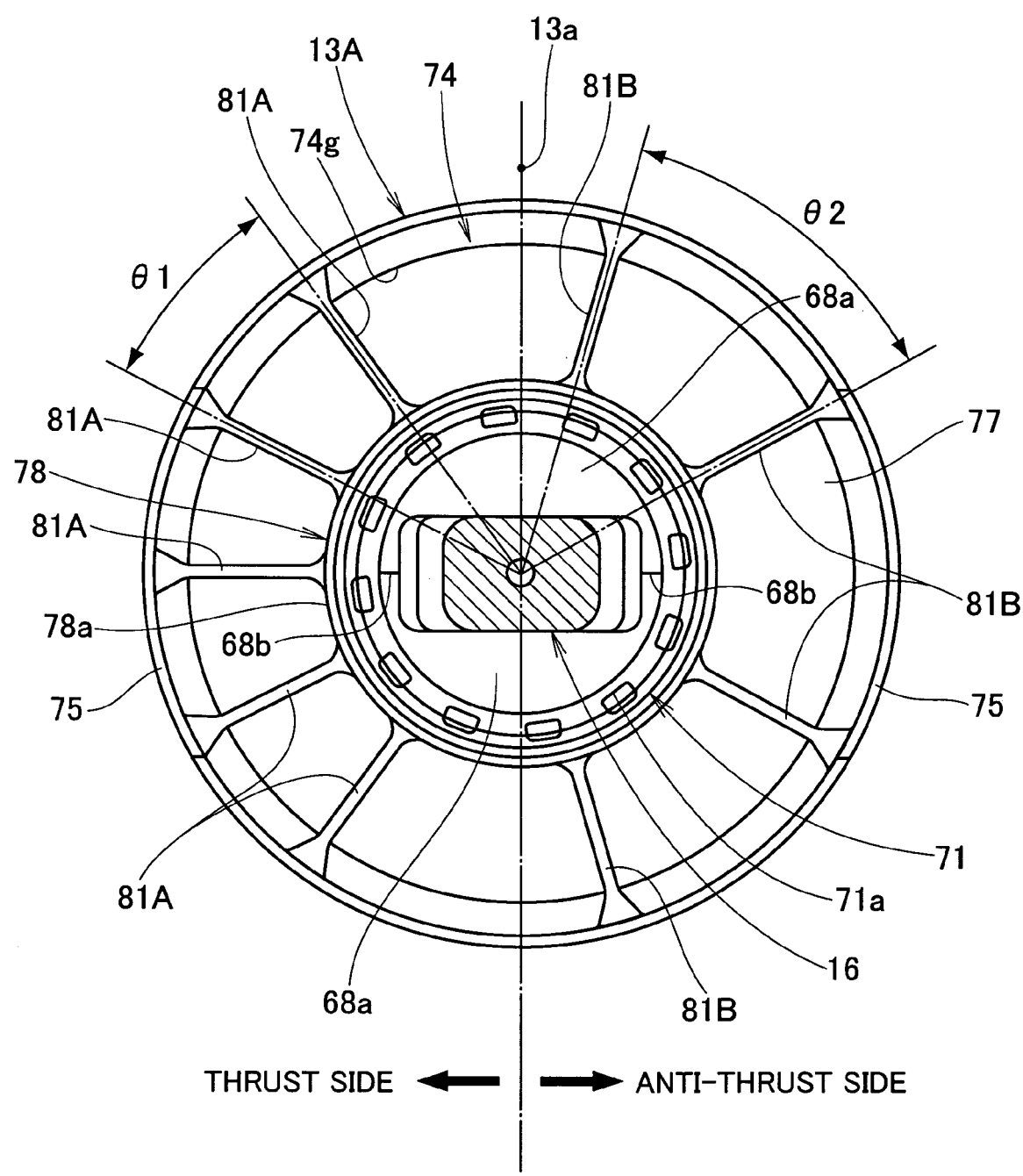
FIG. 10 is a bottom plan view showing the rear surface of the piston according to the second embodiment of this invention.

FIG. 10 shows as the ribs 81 a plurality of ribs 81A and 81B formed radially between the inner surface 74g of the land 74 and the outer surface 78a of the cup-shaped support 78 in the piston 13A and in such a way that the ribs 81A formed on the thrust side of the piston 13A on the left hand of a piston centerline 13a extending at right angles to the swinging direction of the connecting rod 16 relative to the piston 13A, or the horizontal as viewed in the drawing, are asymmetric to the ribs 81B on the anti-thrust side of the piston 13A on the right hand of the piston centerline 13a. More specifically, the ribs 81B on the anti-thrust side are spaced apart from one another by a greater distance than the ribs 81A on the thrust side which are closer to one another are.

For example, there are on the thrust side five ribs 81A having an angle θ1 between every adjoining two and on the anti-thrust side, there are four ribs 81B having between every adjoining two an angle θ2 which is larger than θ1.

The function of the ribs 81 (81A, 81B) will be described below.

Figure 11:
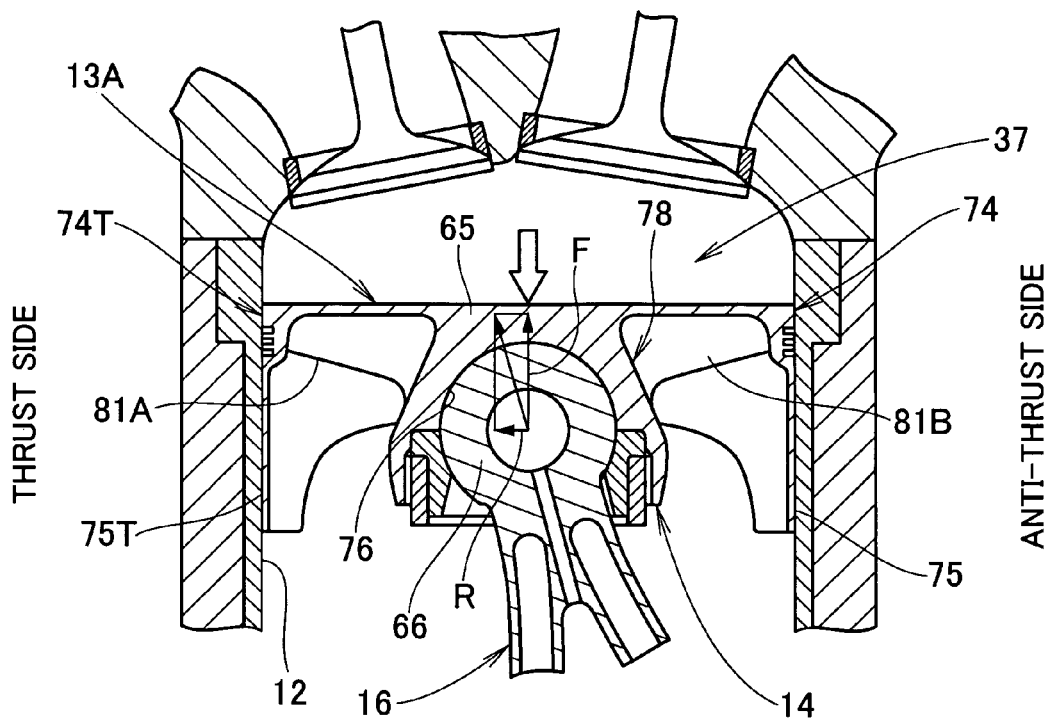
FIG. 11 is a view illustrating the action of ribs in the piston according to the second embodiment of this invention against an external force.

When the explosion of a fuel mixture in a combustion chamber 37 causes the pressure of combustion gases to act upon the crown 65 of the piston 13A as shown by an outline arrow in FIG. 11, the stress thereby produced in the crown 65 is dispersed by the ribs 81A and 81B and is not concentrated locally on any part of the crown 65 or the cup-shaped support 78 (for example, on the base of the cup-shaped support 78). Therefore, a reduction in thickness of the crown 65 does not bring about any increase of stress produced therein, but contributes to a reduction in weight of the piston 13A.

The resultant F of the force of combustion gases and the force of inertia acts upon the piston 13A and thereby produces a thrust R acting upon the land 74T and the skirt 75T on the thrust side of the piston 13A. (The land 74 and skirt 75 on the thrust side are shown as land 74T and skirt 75T in FIG. 11. The same is true in FIG. 12.)

Figure 12:
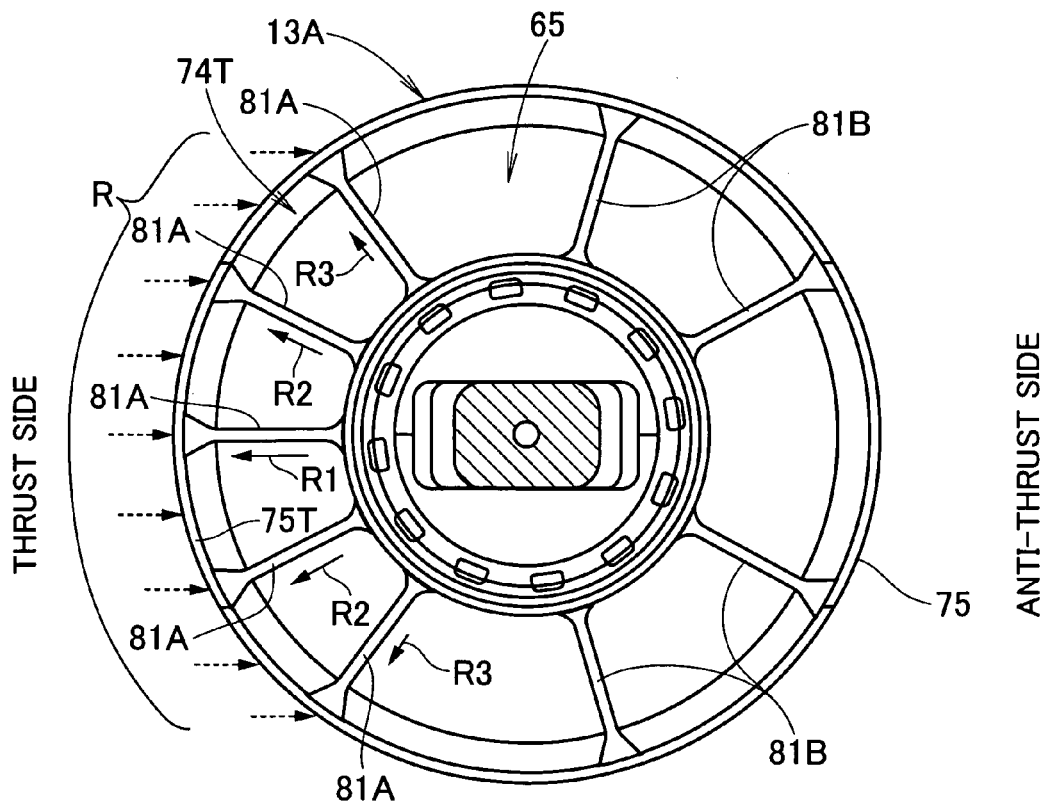
FIG. 12 is a view illustrating the action of the ribs according to the second embodiment of this invention for bearing thrust and dissipating heat.

If the thrust R, which is a reaction force from a sleeve 22 (see FIG. 1), acts upon the land 74T and skirt 75T of the piston 13A in the direction of arrows drawn by broken lines in FIG. 12, the ribs 81A on the thrust side produce reaction forces R1, R2 and R3 as shown by arrows to bear the thrust R.

When the explosion of the fuel mixture in the combustion chamber 37 (FIG. 11) causes the temperature of the crown 65 to rise, the heat of the crown 65 is dissipated through the ribs 81A and 81B effectively, thereby making it possible to lower the temperature of any part of the piston 13A. Referring to FIG. 11, therefore, it is possible to lower the temperature of a spherical joint 14, or more particularly of the concave spherical surface 76 of the cup-shaped support 78 and thereby prevent the disappearance of any oil film from between the concave spherical surface 76 and the small end 66 of the connecting rod 16.

It is, moreover, possible to decrease the thermal expansion of the land 74 and the skirts 75 and thereby maintain the clearances between the wall of a cylinder bore 12 and the land 74 and the wall of the cylinder bore 12 and the skirts 75 within proper ranges.

Figure 13:
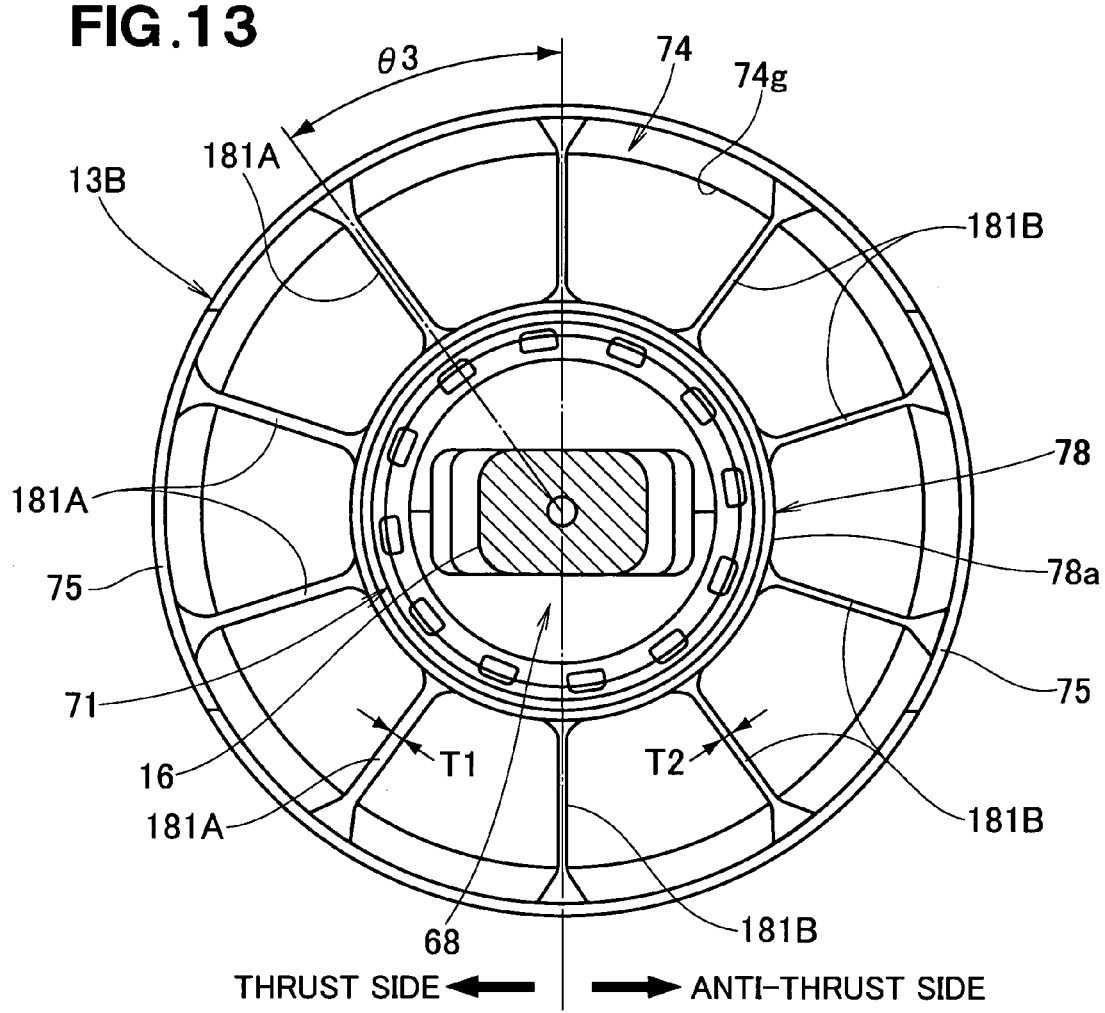
FIG. 13 is a bottom plan view showing the rear surface of the piston according to a third embodiment of this invention.

FIG. 13 shows a plurality of ribs 181A and 181B formed radially between the inner surface 74g of a land 74 and the outer surface 78a of a cup-shaped support 78 in a piston 13B according to still another embodiment of this invention in such a way that the ribs 181A on the thrust side of the piston 13B are asymmetric to the ribs 181B on its anti-thrust side. More specifically, the ribs 181A on the thrust side are larger in thickness (wall thickness) than the ribs 181B on the anti-thrust side.

When the thickness (wall thickness) of each rib 181A on the thrust side is designated as T1 in FIG. 13, for example, T1>T2 when the thickness (wall thickness) of each rib 181B on the anti-thrust side is T2.

Every two adjoining ribs 181A, every two adjoining ribs 181A and 181B and every two adjoining ribs 181B have an equal angle θ3 therebetween.

Figure 14:
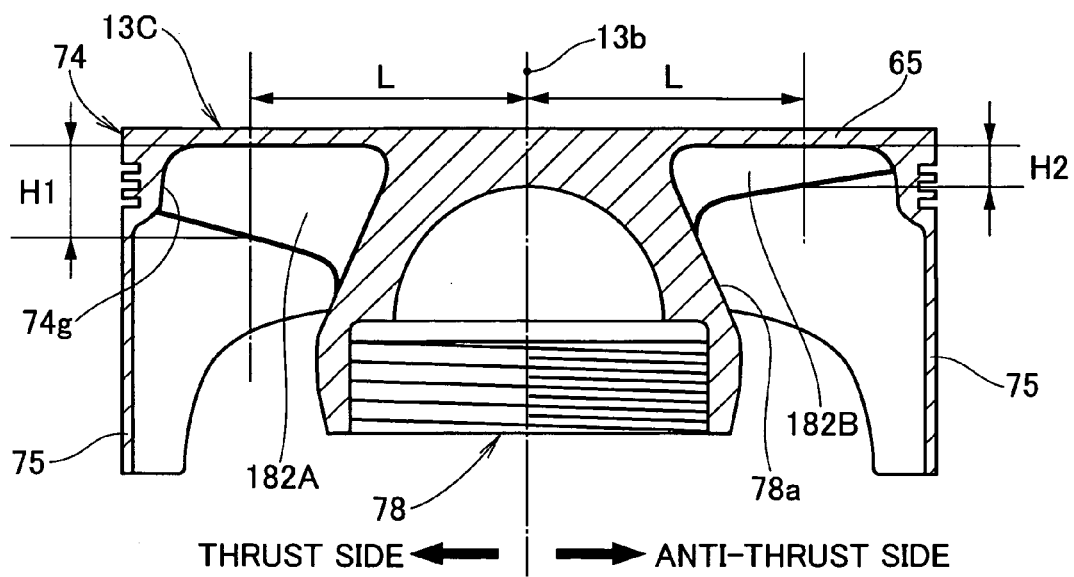
FIG. 14 is a longitudinal sectional view of a piston according to a fourth embodiment of this invention.

FIG. 14 shows a plurality of ribs 182A and 182B (outlined by thicker lines) formed radially between the inner surface 74g of a land 74 and the outer surface 78a of a cup-shaped support 78 in a piston 13C according to still another embodiment of this invention in such a way that the ribs 182A on the thrust side of the piston 13C are asymmetric to the ribs 182B on its anti-thrust side. More specifically, the ribs 182A on the thrust side are larger in height than the ribs 182B on the anti-thrust side.

At a distance L from a centerline 13b through the piston 13C, for example, H1>H2 when the height of the ribs 182A on the thrust side is designated as H1 and that of the ribs 182B on the anti-thrust side as H2.

Figure 15:
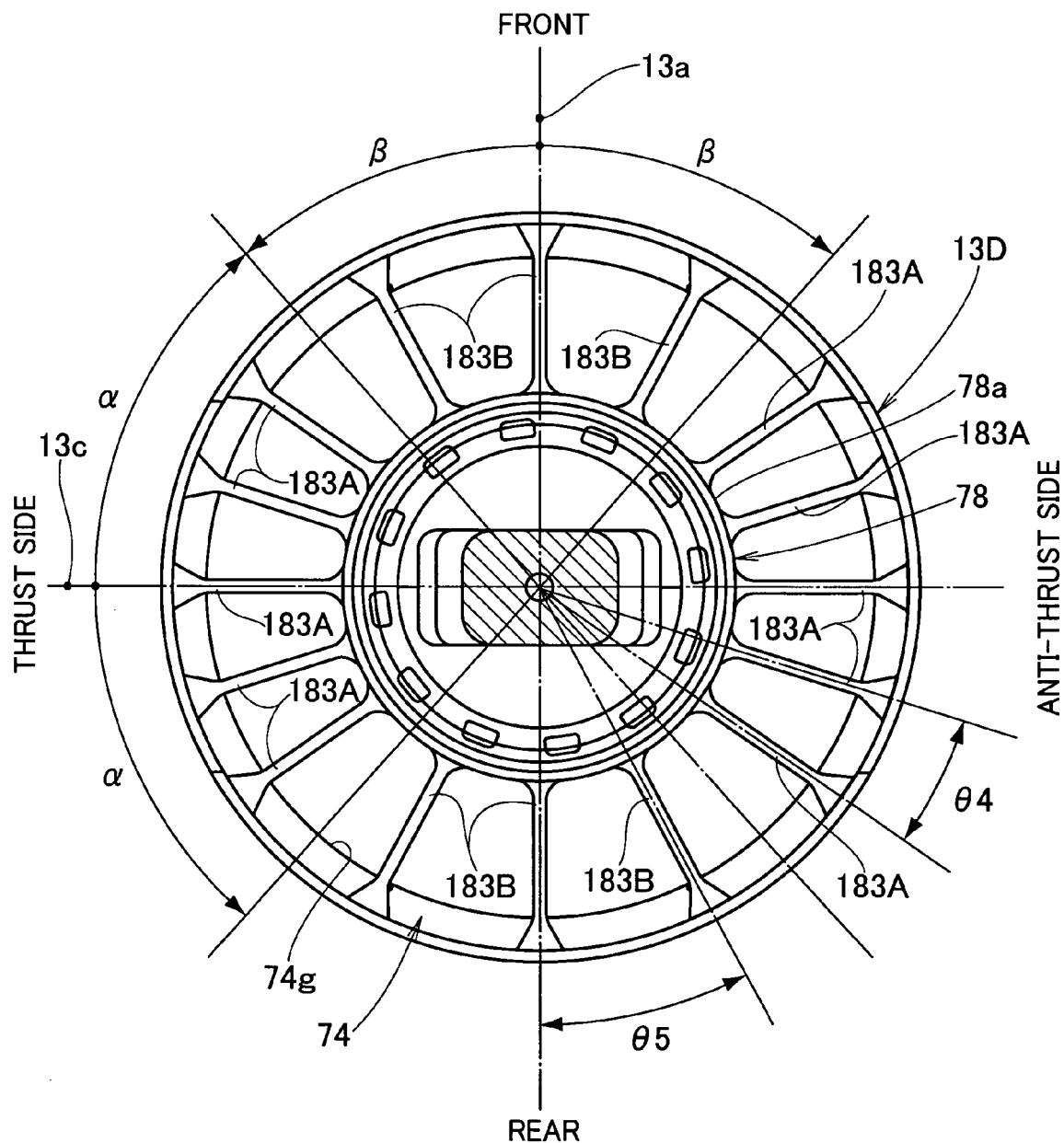
FIG. 15 is a bottom plan view showing the rear surface of the piston according to a fifth embodiment of this invention.
Figure 16:
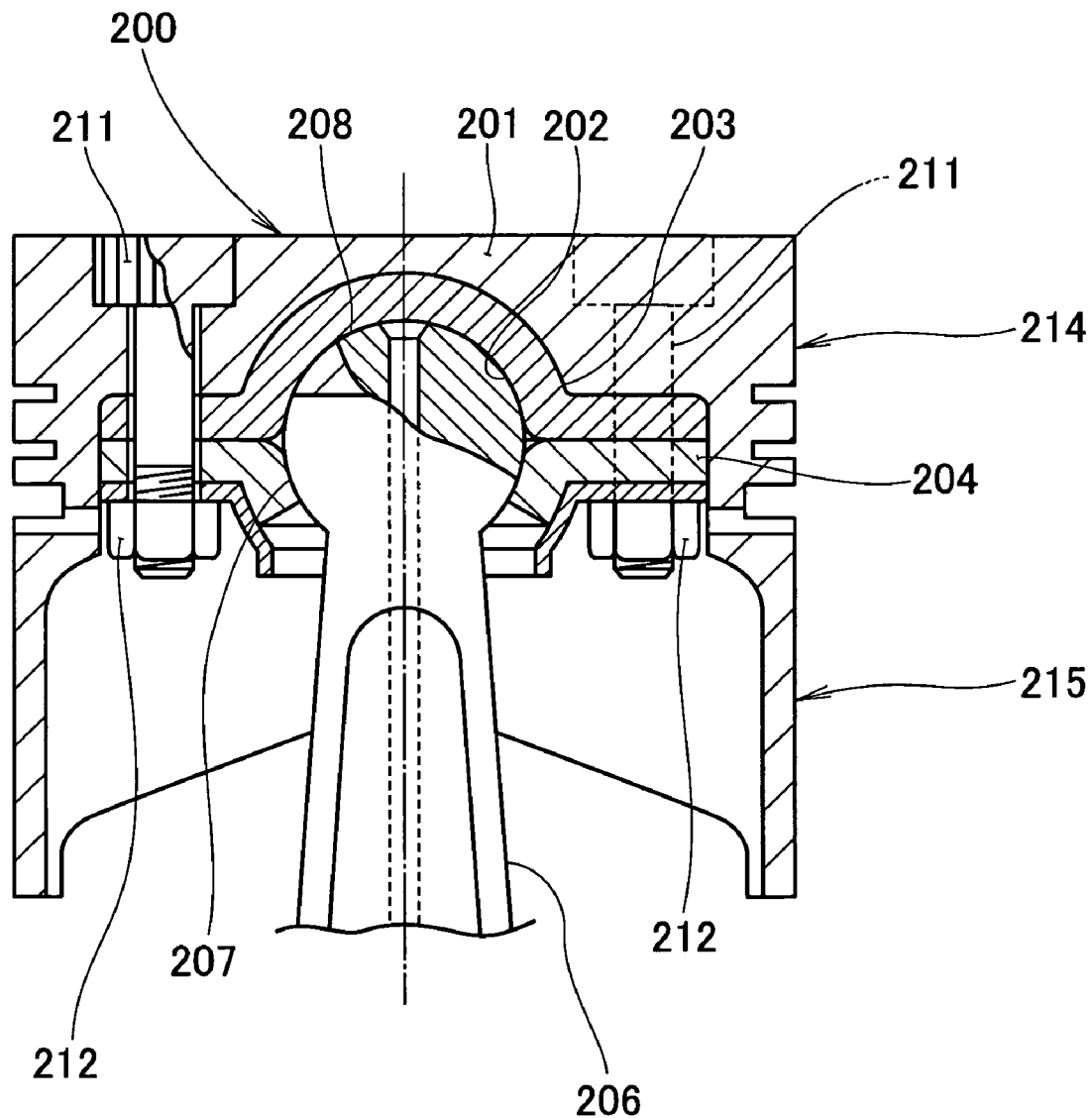
FIG. 16 is a longitudinal sectional view outlining a known piston for an internal combustion engine.
Figure 17:
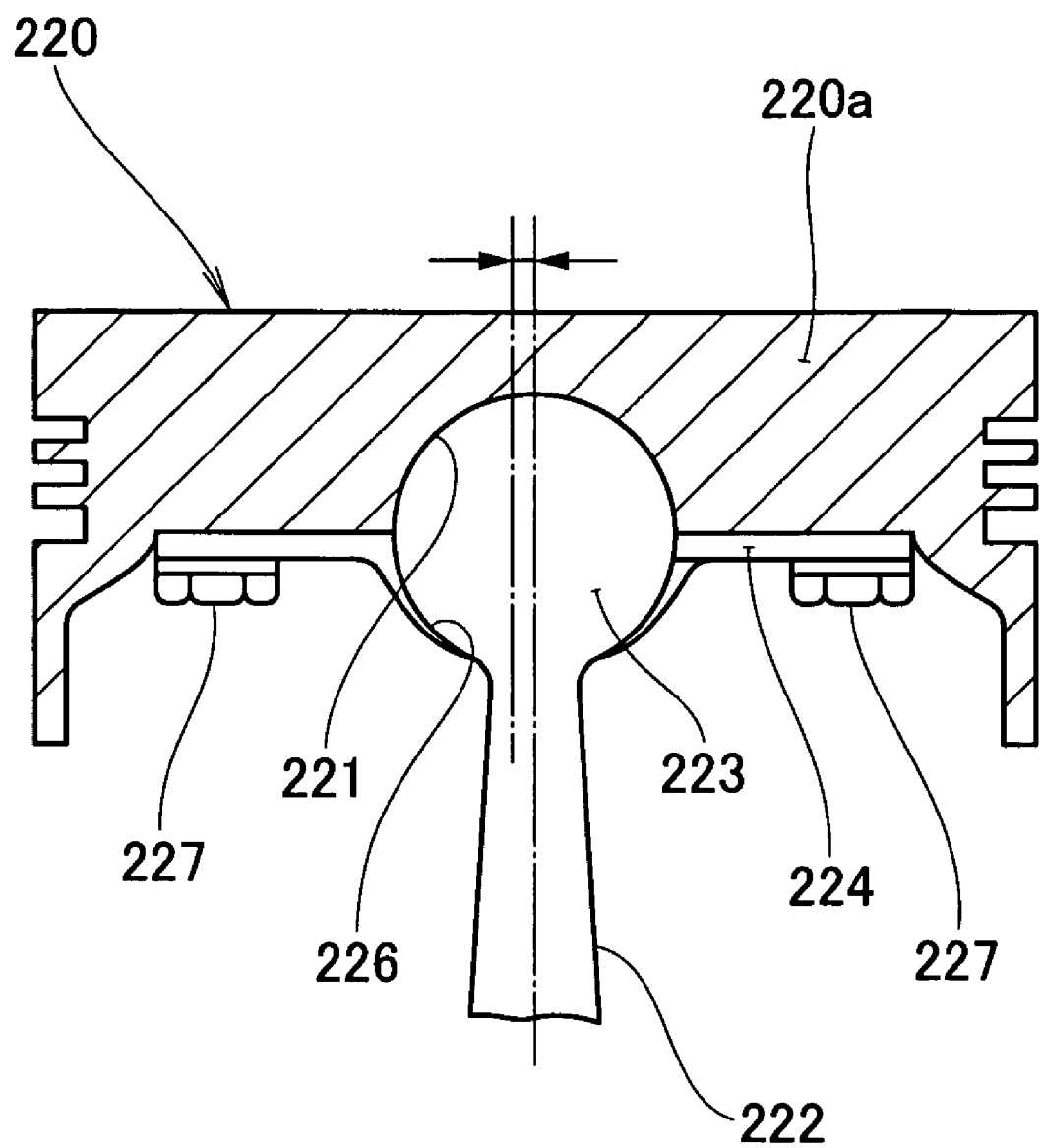
FIG. 17 is a longitudinal sectional view outlining another known piston for an internal combustion engine.
Figure 18:
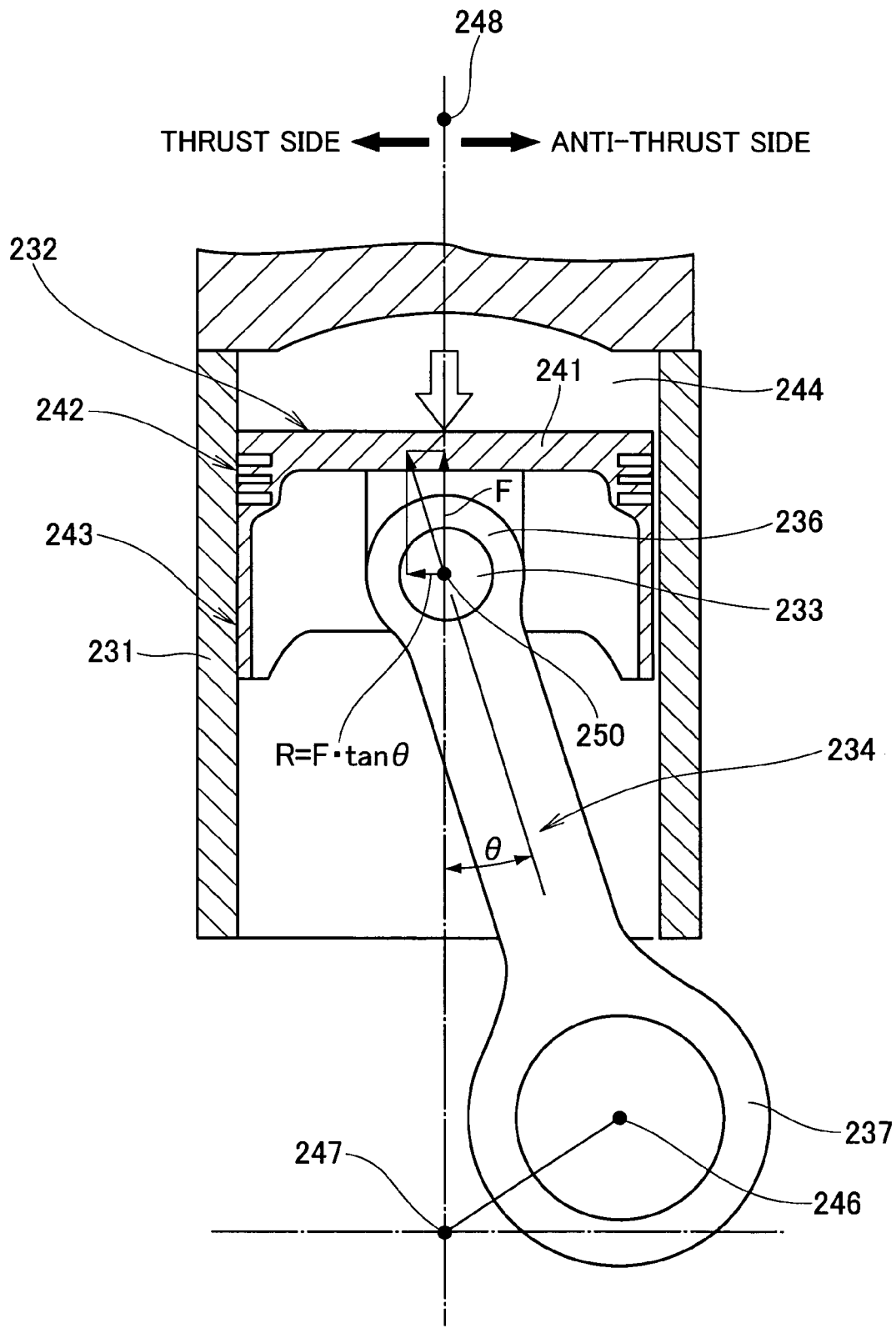
FIG. 18 is a view explaining an external force produced by the pressure of combustion gases and acting upon a piston.

FIG. 15 shows a plurality of ribs 183A and 183B formed radially between the inner surface 74g of a land 74 and the outer surface 78a of a cup-shaped support 78 in a piston 13D according to still another embodiment of this invention in such a way that the ribs 183A on the thrust and anti-thrust sides of the piston 13D are symmetric to each other, and that when that side which is shown above a horizontal piston centerline 13c crossing a vertical piston centerline 13a at right angles thereto is defined as the front side of the piston 13D corresponding to the front side of an internal combustion engine, while that side which is shown below the piston centerline 13c is defined as the rear side of the piston 13D corresponding to the rear side of the engine, the ribs 183B on the front and rear sides of the piston 13D are symmetric to each other, while the ribs 183A situated in an area having an angle α on either side of the piston centerline 13c on both of the thrust and anti-thrust sides are closer to one another than the ribs 183B in an area having an angle β on either side of the piston centerline 13a on both of the front and rear sides are.

When every two adjoining ribs 183A on the thrust and anti-thrust sides have an angle θ4 therebetween, θ4<θ5 when every two adjoining ribs 183B on the front and rear sides have an angle θ5 therebetween.

The larger spacing between every two adjoining ribs 183B does not present any problem, since hardly any force corresponding to thrust acts upon the front or rear side of the piston 13D.

Although the radial ribs have been described as being asymmetric to each other on the thrust and anti-thrust sides of the piston, it is alternatively possible to form those ribs in such a way that they may be asymmetric to each other on the front and rear sides of the piston.

Obviously, various minor changes and modifications of the present invention are possible in the light of the above teaching. It is therefore to be understood that within the scope of the appended claims the invention may be practiced otherwise than as specifically described.

What is claimed is:

1. A piston for an internal combustion engine comprising:
a crown;
tubular walls extending from an edge of the crown; and
a cup portion protruding from a rear surface of the crown, the cup portion having a concave hemispherical inner surface for forming a spherical joint with a spherical small end on a connecting rod, the cup portion having a outer diameter which gradually increases in size in a direction away from the rear surface of the crown,
wherein the tubular walls and the cup portion are joined together by ribs, the ribs extending downward from a rear surface of the crown and radially outward from an outer surface of the cup portion, and
wherein the spherical joint includes a holder and a nut with male threads for fixing the holder to female threads of the cup portion.

2. The piston for an internal combustion engine, according to claim 1, wherein the ribs on an anti-thrust side are symmetrical to the ribs on a thrust side.

3. The piston for an internal combustion engine, according to claim 1, wherein the ribs are spaced apart from one another by a larger distance on an anti-thrust side than on a thrust side.

4. The piston for an internal combustion engine, according to claim 1, wherein the ribs are smaller in wall thickness on an anti-thrust side than on a thrust side.

5. The piston for an internal combustion engine, according to claim 1, wherein the ribs are smaller in height on an anti-thrust side than on a thrust side.

6. The piston for an internal combustion engine, according to claim 1, wherein the ribs are equally spaced apart.

7. The piston for an internal combustion engine, according to claim 1, wherein the ribs on a front and rear side are spaced apart further than the ribs on an anti-thrust side and a thrust side.

8. The piston for an internal combustion engine, according to claim 1, wherein the holder includes two holder halves, each holder half including a shoulder,
and the nut has its upper end held against the shoulders to fix the holder halves in position.

9. The piston for an internal combustion engine, according to claim 1, wherein an outer diameter of the nut is larger than the outer diameter of the cup portion adjacent to the rear surface of the crown.

10. The piston for an internal combustion engine, according to claim 1, wherein the nut is formed with a plurality of engaging recesses disposed around outer peripheral edges thereof so that a tool may be engaged therein.

11. The piston for an internal combustion engine, according to claim 1, wherein an inner diameter of the nut is larger than an outer diameter of the spherical small end on the connecting rod, the nut surrounding the spherical small end on the connecting rod when the spherical joint is formed.

12. A piston for an internal combustion engine comprising:
a crown;
a tubular wall extending from an edge of the crown; and
a cup portion formed on a rear surface of the crown for forming a spherical joint with a spherical small end on a connecting rod, the cup portion and tubular walls being joined together by radial ribs, the ribs extending downward from a rear surface of the crown,
wherein the radial ribs on a thrust side of the piston are asymmetric to those on an anti-thrust side of the piston,
the spherical joint including a holder and a nut with male threads for fixing the holder to female threads of the cup portion.

13. The piston for an internal combustion engine, according to claim 12, wherein the radial ribs are spaced apart from one another by a larger distance on the anti-thrust side than on the thrust side.

14. The piston for an internal combustion engine, according to claim 12, wherein the radial ribs are smaller in wall thickness on the anti-thrust side than on the thrust side.

15. The piston for an internal combustion engine, according to claim 12, wherein the radial ribs are smaller in height on the anti-thrust side than on the thrust side.

16. The piston for an internal combustion engine, according to claim 12, wherein the holder includes two holder halves, each holder half including a shoulder, and
wherein the nut has its upper end held against the shoulders to fix the holder halves in position.

17. The piston for an internal combustion engine, according to claim 12, wherein the nut is formed with a plurality of engaging recesses disposed around outer peripheral edges thereof so that a tool may be engaged therein.

18. The piston for an internal combustion engine, according to claim 12, wherein an inner diameter of the nut is larger than an outer diameter of the spherical small end on the connecting rod, the nut surrounding the spherical small end on the connecting rod when the spherical joint is formed.

* * * * *